May 10, 1960

M. G. VAUGHN 2,935,834

CORN EAR PICK-UP DEVICE

Filed June 25, 1958

Witness
Edward P. Seeley

Inventor
Melvin G. Vaughn
by M. Talbert Dick
Attorney

May 10, 1960   M. G. VAUGHN   2,935,834
CORN EAR PICK-UP DEVICE
Filed June 25, 1958   2 Sheets-Sheet 2
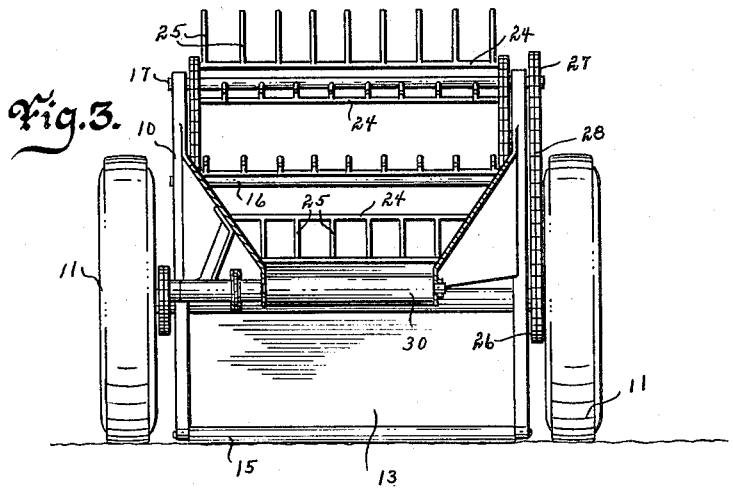
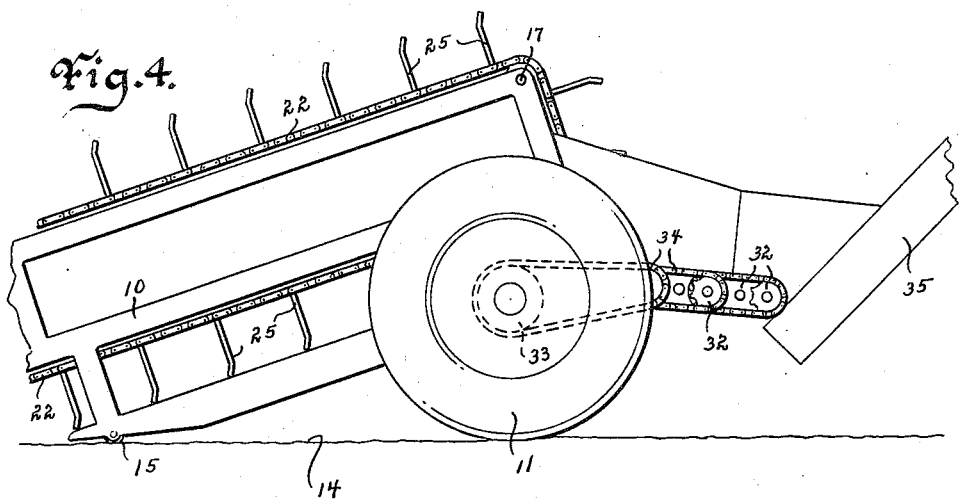
Witness
Edward P. Sedley
Inventor
Melvin G. Vaughn
by M. Talbert Dick
Attorney

United States Patent Office 2,935,834
Patented May 10, 1960

2,935,834

CORN EAR PICK-UP DEVICE

Melvin G. Vaughn, Dallas County, Iowa

Application June 25, 1958, Serial No. 744,475

4 Claims. (Cl. 56—15)

This invention relates to agriculture implements and more particularly to a machine that will pick up grounded ears of corn not harvested by the mechanical corn picker.

Corn is one of the most important crops grown in this country. Until relatively recent times the ears of corn were all hand harvested and this included not only the ears on the stalks but the ears that had fallen onto the ground. Then came the advent of the mechanical powered corn picker. These pickers only harvest the ears that are on standing stalks. Furthermore such machines and their pulling means, by this very nature, knock many ears loose and to the ground. Also adverse weather and insects cause much corn to fall onto the ground. The result is that many bushels of corn per acre are lost. Approximately fifty million acres of corn are planted annually in the United States and therefore the corn loss by down ears is terrific. The loss in the State of Iowa alone is estimated at seventy five million bushels. Not only are the down ears lost, but their seeding of the field the next year is highly objectionable and entails time, labor and costs to clear the field of such objectionable growth. One obvious possible solution would be to manually pick the down ears after the mechanical picker had harvested the field. From a practical standpoint this is impossible. First, one would have to stoop over, reach to the ground level, and then straighten up, for each ear obtained. No one could endure such exertion for long. Secondly, there is no labor obtainable for this work.

Therefore one of the principal objects of my invention is to provide a machine that will retrieve grounded ears of corn.

A further object of this invention is to provide a mechanized implement for picking up ears of corn from the ground that cleans the same of certain foreign matter, and deposits the corn into a wagon, truck or like box.

A still further object of my invention is to provide a down ear of corn gleaning device that conforms to the ground surface variation between the rows of corn.

A still further object of this invention is to provide a machine for gathering loose ears of corn that is easily operated and rapid.

Still further objects of my invention are to provide a machine for gleaning ears of corn left in a field after the use of a mechanical picker, that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 3 is a back view of my gleaner taken on line 3—3 of Fig. 2 and with sections cut away to more fully illustrate its construction; and Fig. 4 is an enlarged side portion of the device.

Figure 1:
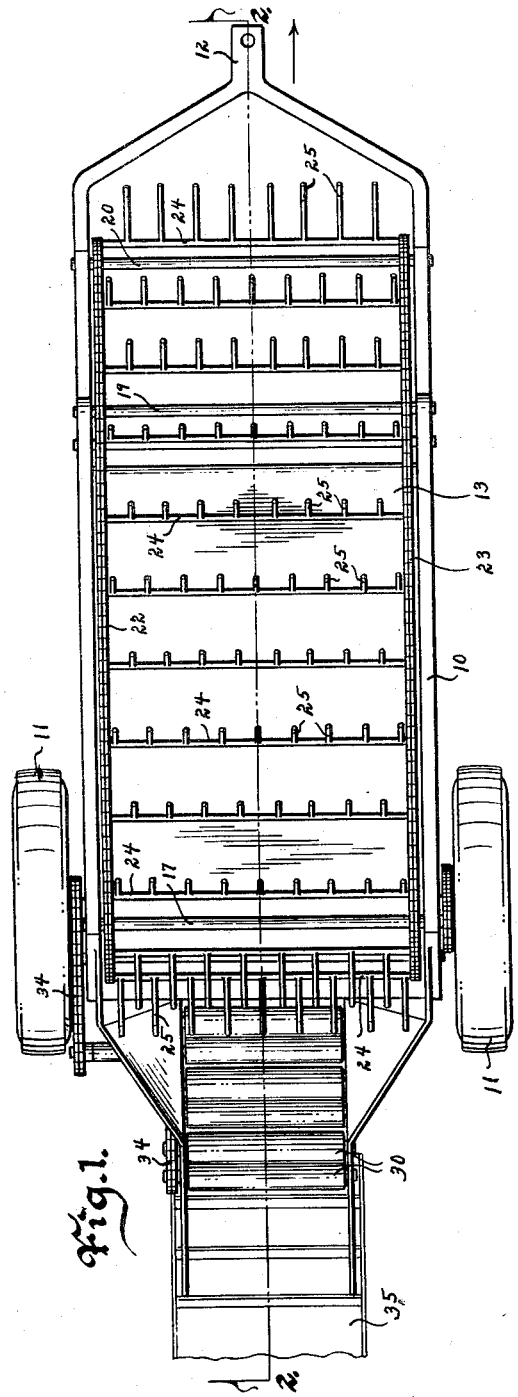
Fig. 1 is a top plan view of my device ready for use.

In the drawings I have used the numeral 10 to designate a chassis having supporting wheels 11. This chassis may have any number of wheels, and may be self-propelled, pulled or pushed by a prime mover such as a tractor. In the drawings I show the chassis having a tongue 12 adapted to be secured to a tractor or like.

Figure 2:
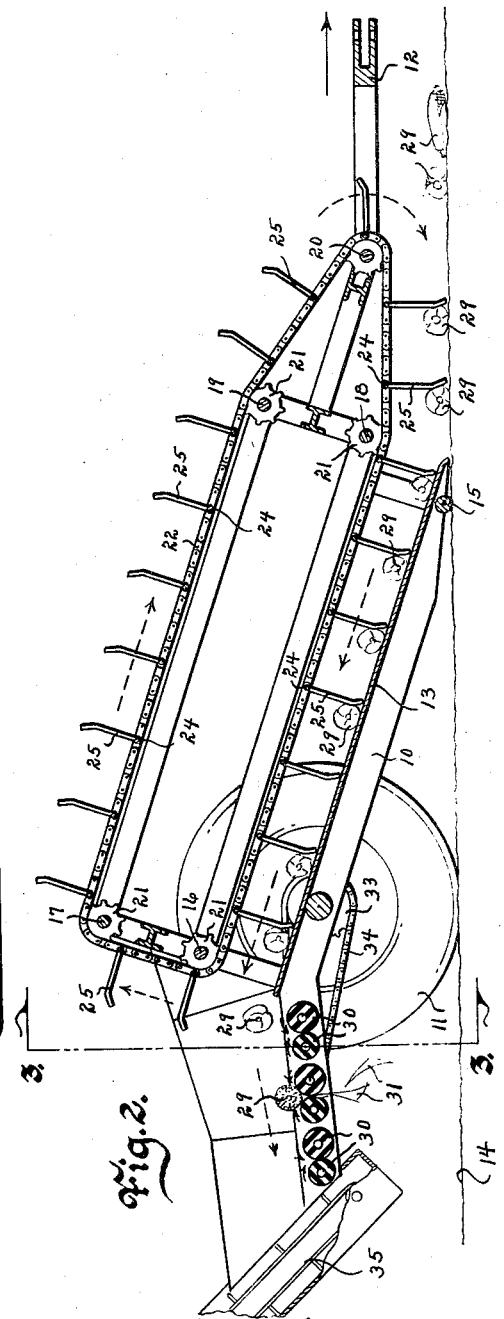
Fig. 2 is a side sectional view of the machine taken on line 2—2 of Fig. 1.

The numeral 13 designates a straight flat platform secured to the chassis and extending forwardly and downwardly as shown in Fig. 2. The forward edge of this platform is prevented from digging into the ground surface 14 by a roller or wheel 15.

The numeral 16 designates a horizontal rotatably mounted shaft on the chassis and above the rear end portion of the platform. The numeral 17 designates a like horizontal rotatable shaft spaced above the shaft 16. The numeral 18 designates a horizontal rotatably mounted shaft on the chassis and above the forward end area of the platform. The numeral 19 designates a like horizontal rotatable shaft spaced above the shaft 18. The numeral 20 designates a fifth rotatably mounted horizontal shaft on the chassis and positioned forwardly of the shafts 18 and 19 and at an elevation substantially that of the shaft 18. The numeral 21 designates a pair of spaced apart sprocket wheels rigidly secured on each of the shafts 16, 17, 18, and 19. By this arrangement there will be a sprocket wheel on each shaft at the left side of the implement and a sprocket wheel on each shaft at the right side of the implement as shown in Fig. 1. The numeral 22 designates an endless chain embracing all the sprocket wheels at the left side of the machine, and the numeral 23 designates an endless chain embracing all the sprocket wheels at the right side of the machine. The numeral 24 designates a plurality of spaced apart bars secured to and extending between the two chains 22 and 23. The numeral 25 designates a plurality of spaced fingers extending outwardly from each of the bars 24 as shown in Fig. 3. These fingers 25 as they extend downwardly from the under side of the endless chains, have their outer end portions extending downwardly and forwardly. Thus the outer end portions of these fingers are bent back at an angle to their direction of travel. The lengths of the fingers 25 are just slightly less than that of the distance between the under side of the endless chains and the platform 13.

These endless chains 22 and 23 may be rotated by any suitable means such as a tractor take-off, motor, or like. In the drawings I show the chains 22 and 23 powered for rotation by being operatively connected to one of the wheels 11. This is accomplished by securing a sprocket wheel 26 to a wheel 11, a sprocket wheel 27 to the shaft 17 and with an endless chain 28 embracing the sprocket wheels 26 and 27 as shown in Fig. 3. As the implement moves over the field, the endless chains 22 and 23 will be rotated and the fingers 25 will follow in the path shown by arrows in Fig. 2. The chains 22 and 23 and the bars 24, form an endless belt means having the fingers 25. These fingers 25 will contact the down ears of corn 29, move them rearwardly onto the top of the platform, and rearwardly over the platform until they pass downwardly from the rear end of the platform. It will be appreciated by the sprocket wheels 21 on the shafts 18 and 19 being substantially spaced apart, and the sprocket wheels 21 on the shaft 20 being substantially forward of and in the same horizontal plane as the sprocket wheels 21 on the shaft 18, the length of endless belt means and the particular associated fingers of this length of the belt means that travels between the shafts 18 and 20 will be horizontal and parallel with the ground surface. Directly to the rear and below the platform 13, I have a plurality of pairs of husking rolls 30 rotatably mounted on the chassis and horizontally arranged. The front roll of each pair is of a diameter greater than the other in order to encourage the movement of the ears to the rear. These husking rolls remove the husks 31 from the ears in the usual manner, by each pair of rolls rotating toward each other as shown by short arrows in Fig. 2. These rolls may be powered by any suitable means. In the drawings I show them each having a sprocket wheel 32, a sprocket wheel 33 on a ground wheel 11, and endless chains 34 connecting them as shown in Fig. 4. The numeral 35 designates an ordinary elevator means secured to the chassis for receiving the gathered and husked ears from the rollers 30, and elevating the same upwardly and rearwardly into a wagon box or like.

From the foregoing it will be appreciated that by merely moving my implement over the ground surface down ears of corn will be picked up, processed and delivered to a wagon or the like.

Some changes may be made in the construction and arrangement of my machine for gathering down ears of corn without departing from the real spirit and purpose of my invention, and it is my intention to cover by my claims, any modified forms of structure or use of mechanical equivalents which may be reasonably included within their scope.

I claim:

1. In an ear corn pick-up implement, a chassis, wheels supporting said chassis, a downwardly and forwardly extending platform on said chassis, a ground engaging guide wheel means at the forward end of said platform, an endless belt means rotatably mounted on said chassis above said platform and extending forwardly of said platform, a means for rotating said endless belt means, and a plurality of fingers extending outwardly from said endless belt means for engaging down ears of corn, moving them rearwardly onto and rearwardly over said platform.

2. In an ear corn pick-up implement, a chassis, wheels supporting said chassis, a downwardly and forwardly extending platform on said chassis, an endless belt means rotatably mounted on said chassis above said platform and extending forwardly of said platform, a means for rotating said endless belt means, and a plurality of fingers extending outwardly from said endless belt means for engaging down ears of corn, moving them rearwardly onto and rearwardly over said platform; said fingers having their outer end portions bent back at an angle to their direction of travel.

3. In an ear corn pick-up implement, a chassis, wheels supporting said chassis above the ground surface over which the implement is adapted to travel, a downwardly and forwardly extending platform on said chassis, an endless belt means rotatably mounted on said chassis above said platform and extending forwardly of said platform; said belt means having the lower forward end area of its travel extending horizontal and parallel to the ground surface over which the implement travels, a means for rotating said endless belt means, a plurality of fingers extending outwardly from said endless belt means for engaging down ears of corn, moving them rearwardly onto and rearwardly over said platform, and an elevator means on said chassis.

4. In an ear corn pick-up implement, a chassis, wheels suppoting said chassis, a downwardly and forwardly extending platform on said chassis, a first set of sprocket wheels rotatably mounted on the rear portion of said chassis, a second set of sprocket wheels rotatably mounted on said chassis and above said first mentioned sprocket wheels, a third set of sprocket wheels rotatably mounted on the forward portion of said chassis, a fourth set of sprocket wheels rotatably mounted on said chassis and above said third set of sprocket wheels, a fifth set of sprocket wheels operatively rotatably mounted on said chassis, forward of said platform and in the same horizontal plane as said third set of sprocket wheels, a belt means embracing said first, second, third, fourth and fifth set of sprocket wheels, means for rotating said belt means, and a plurality of fingers extending outwardly from said belt means capable of engaging down ears of corn, moving the same onto said platform, and rearwardly upward over said platform.

References Cited in the file of this patent

UNITED STATES PATENTS

| | | |
|---|---|---|
| 2,230,139 | Gustin | Jan. 28, 1941 |
| 2,513,941 | Hyman | July 4, 1950 |
| 2,531,379 | Chickering | Nov. 28, 1950 |
| 2,703,953 | Altemus | Mar. 15, 1955 |